(12) United States Patent
Boncodin

(10) Patent No.: US 7,493,974 B1
(45) Date of Patent: Feb. 24, 2009

(54) SOLAR POWERED ENGINELESS VEHICLE

(76) Inventor: Franz B. Boncodin, 4327 Woodruff Ave., Lakewood, CA (US) 90713-2552

( * ) Notice: Subject to any disclaimer, the term of this patent is extended or adjusted under 35 U.S.C. 154(b) by 0 days.

(21) Appl. No.: 11/999,836

(22) Filed: Dec. 7, 2007

(51) Int. Cl.
*B60K 16/00* (2006.01)
(52) U.S. Cl. ........................ 180/2.2; 180/65.1
(58) Field of Classification Search ............... 180/2.1, 180/2.2, 65.1, 65.5
See application file for complete search history.

(56) References Cited

U.S. PATENT DOCUMENTS

| | | | | |
|---|---|---|---|---|
| 4,592,436 | A * | 6/1986 | Tomei | 180/2.2 |
| 6,423,894 | B1 * | 7/2002 | Patz et al. | 136/244 |
| 6,991,051 | B2 * | 1/2006 | Swindell et al. | 180/65.1 |
| 2002/0153178 | A1 * | 10/2002 | Limonius | 180/2.2 |
| 2006/0113118 | A1 * | 6/2006 | Kim | 180/2.2 |
| 2007/0145924 | A1 * | 6/2007 | Obayashi | 318/376 |
| 2007/0261896 | A1 * | 11/2007 | Shaffer et al. | 180/2.2 |

* cited by examiner

*Primary Examiner*—Christopher P Ellis
*Assistant Examiner*—John D Walters
(74) *Attorney, Agent, or Firm*—Stetina Brunda Garred & Brucker

(57) ABSTRACT

A solar powered thermoelectric vehicle lacking an internal combustion engine. The vehicle may include a fiber optics bundle heat collector/conductor, a heating element embedded within a heat sink, a plurality of thermoelectric chips mounted around the outer surface of the heat sink, a hollow body surrounding the heat sink with a space present between the heat sink and the hollow body, a power converter, a plurality of thermoelectric power generators, an extended heat motor/apparatus, and at least one DC motor mounted to a wheel of the vehicle. The vehicle is capable of running without practical driving distance limitations under all weather conditions, day or night, without use of fossil or alternative fuels, and without generating and introducing toxic emissions into the environment.

20 Claims, 10 Drawing Sheets

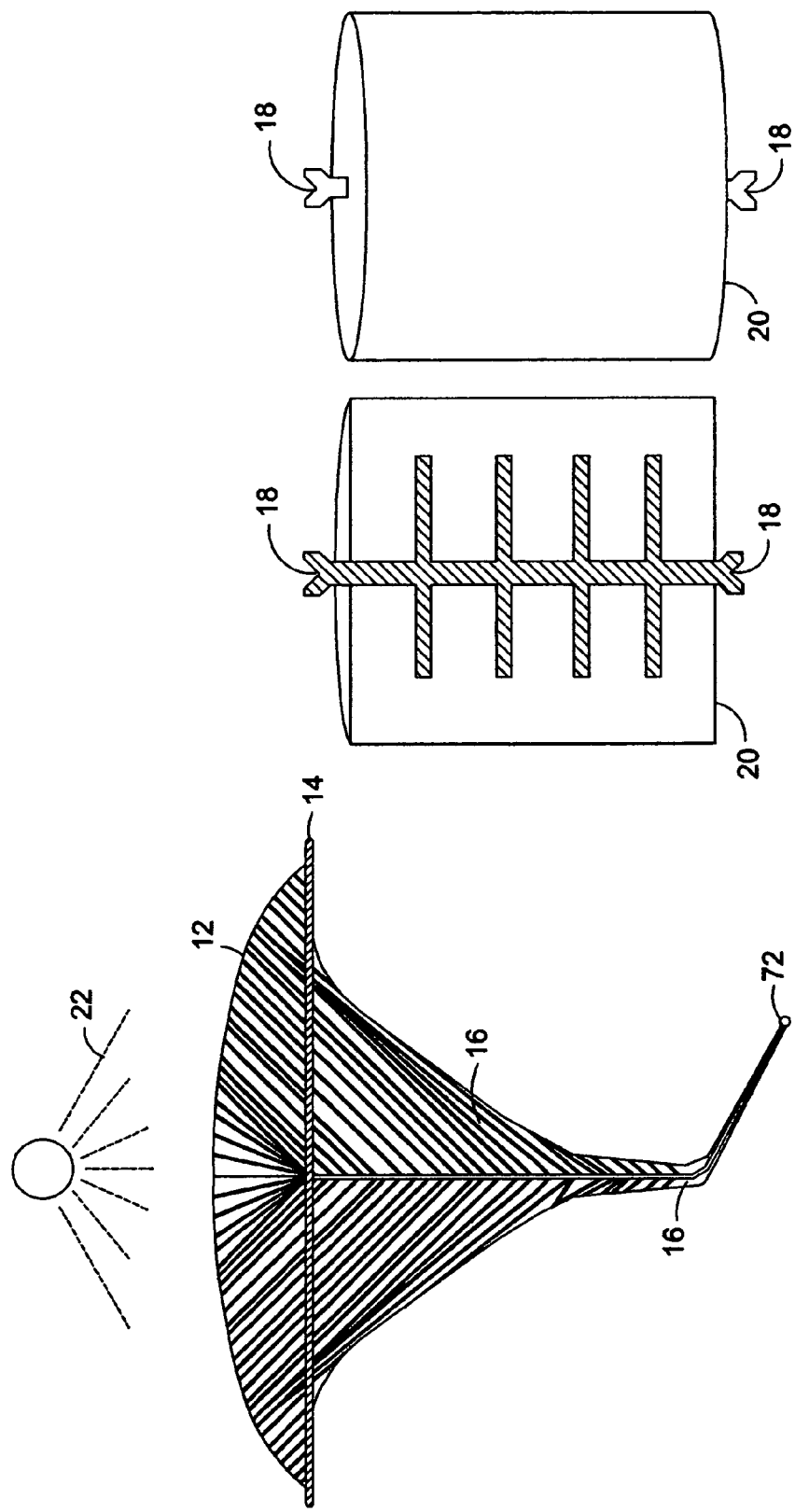

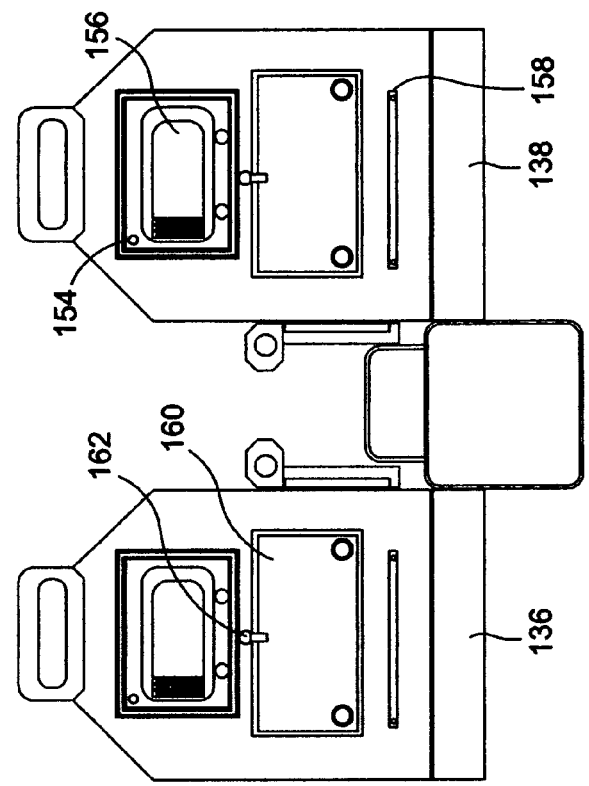
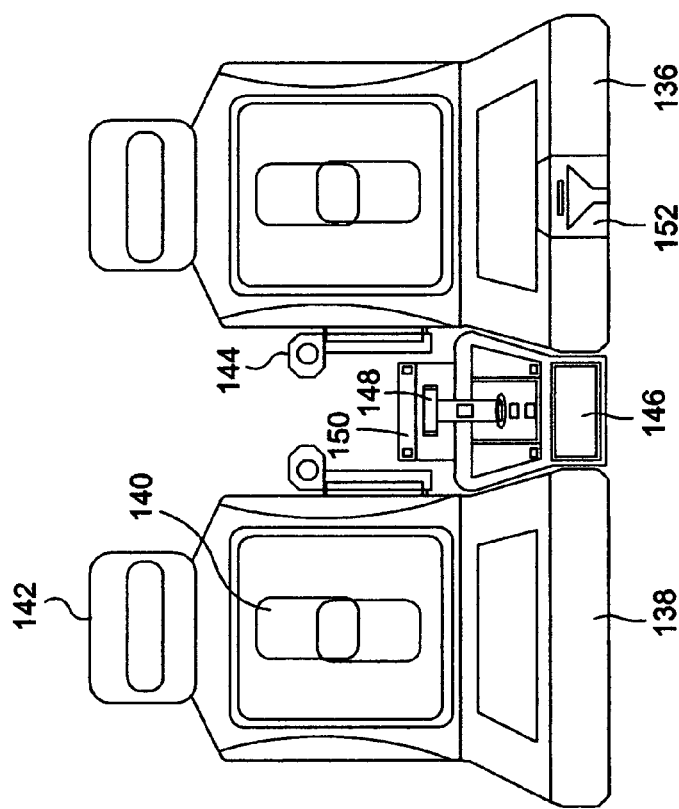
FIG. 11
FIG. 10

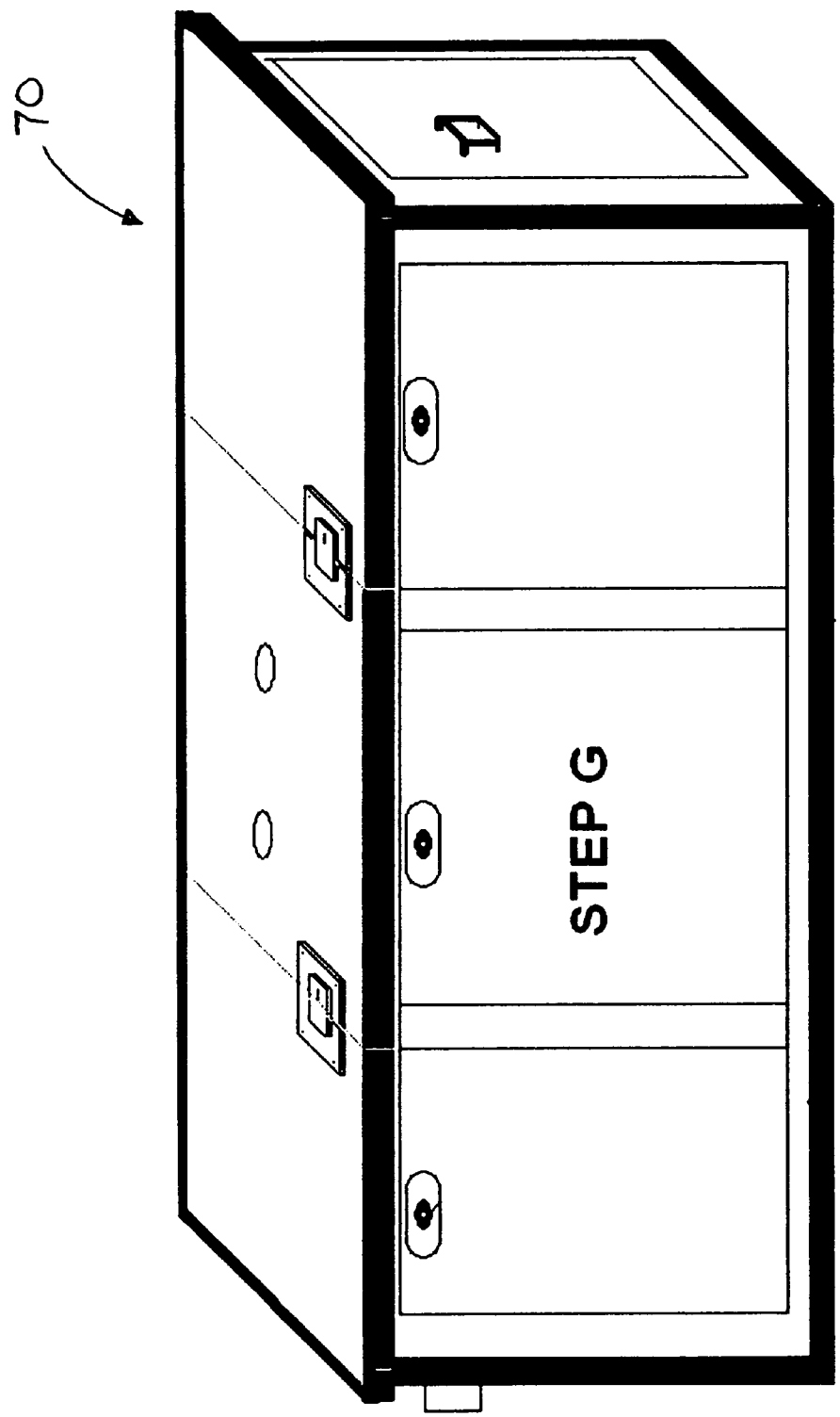
Fig 12-A

SOLAR POWERED ENGINELESS VEHICLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention relates to vehicles that do not use combustion engines and therefore do not require diesel, gasoline, alcohol, ethanol, additives, other liquid gases or fuels, or sets of batteries to operate. In particular, the present invention relates to Solar Thermoelectric Powered Vehicles (STEPV). More particularly, the present invention relates to vehicles having a thermoelectric power generator power source heated by sunlight.

2. Background of the Invention

For many decades now it has been recognized that there is a definite, proven, and continuing degradation of Earth's environment caused at least partially by human activities. Most countries agree that the causes of such degradation or environmental pollution are attributable to, but not necessarily limited to: (1) combustion engines burning fossil fuels; (2) smoke stacks; (3) abuse and devastation of world forests, rivers, lakes, and oceans; (4) irresponsible solid and liquid disposal methods; (5) politics; (6) standards of living; and (7) the sheer number of people living on the planet exhaling a combined 24 billion kilograms of carbon dioxide every day.

For the purpose of this invention, "air pollution" is defined as the introduction of any form of substance, gas, or element other than pure air or oxygen into the atmosphere. One of the objects of the present invention is to address the first environmental pollution problem discussed above, i.e., the burning of fossil fuels by combustion engines. Various civilian, government, and military sectors have advanced solutions for reducing or slowing down air pollution caused by combustion engines that burn fossil fuels. Governments, the public, and car companies have all pushed for more efficient combustion engines, cleaner and cheaper diesel and gasoline fuels, alternative fuel sources, hybrid vehicles, and fully electric vehicles. All of these methods are well intentioned; however, factors such as cost, politics, corporate interests, economics, and special interest groups limit their applicability.

So far the entire world has been focused on reducing one of the major sources of air pollution, i.e., combustion engines burning fossil fuels and introducing toxic emissions into the atmosphere. The reduction of burnt fossil fuels, although an admirable goal, is only a partial solution to an acute problem. One goal of the present invention is eliminating air pollution caused by combustion engines. This approach is practical, thorough, and complete, without creating deadly chemical cycles and unexpected side-effects.

Another goal of the present invention is to realize a shift from an oil-based economy to a non-oil-based global community resulting in a new "smokeless" generation. This generation will be able to retire combustion engines and the use of fossil fuels to run them. A hope is that this change will encourage more harmonious geo-political relations among the countries of the world and would result in creating a level playing field in developing economies of the world.

The thermoelectric "Seebeck effect" was discovered by German-Estonian physicist Thomas Johann Seebeck in 1821. Unlike photovoltaic technology, which generates electricity through the use of solar cells, the Seebeck or thermoelectric effect is the direct conversion of thermal differentials to electric voltage. The reverse of the Seebeck effect is the "Peltier effect," which generates cooling. This reverse cooling/heating characteristic of thermoelectric technology is not found in the photovoltaic technology.

Since the discovery of the Seebeck effect, thermoelectric module design and construction has been mechanical, therefore having a minimal conversion efficiency. Although this mechanical construction has served industries well for more than a hundred years, it was not until some 25 years ago when innovations made by the semi-conductor industry allowed for the design and construction of conventional mechanical thermoelectric modules to chip-type design, materials, and construction. These innovations have improved the conversion efficiency, allowing for newer thermoelectric "chips" or "modules." More work, however, may result in even greater conversion efficiency of thermoelectric chips.

For thermoelectric modules or chips to work, their "hot side" must be exposed to heat. Various heating materials (such as, "heat sinks") and configurations may be used. In the present invention, the heat sinks of choice are, but are not limited to, specially formulated carbon graphite cylindrical blocks, metals, ceramics, tiles, or like materials. The cylindrical shape is preferred because it affords efficient and uniform distribution of heat and cooling characteristics. The selected heat sink must be designed to be thermally conductive, but not electrically conductive, and should function as a "heating agent" only.

In order for the thermoelectric modules or chips to become hot so as to generate electricity, the heat sink must be made hot. To make the heat sink hot, heat sources must be harnessed and/or conducted. The present invention utilizes sunlight as a heat source. The heat sink must be able to easily absorb and retain heat for a long period of time and may be plugged into an electrical outlet to make the heat sink hot when sunlight is not available.

BRIEF SUMMARY

Having identified the thermoelectric chips, heat sink, and heat source, the manner, method, design, material, and construction of the heat delivery apparatus, system, or method will now be discussed. The collection of heat generated by the sun is made possible by designing, constructing, and using specially formed fiber optics. Bundles of fiber optic strands are put together on one end to form an umbrella-like shape so as to capture and conduct heat to the heat sink. The other end of the umbrella-like fiber optic bundles is designed to form a funnel-shape configuration. Each fiber optic strand is specially shaped to achieve the umbrella-like form which is exposed to sunlight. The funnel-shaped body of the bundled fiber optics delivers captured heat to the heat sink. The lower tip of the fiber bundle may be made of plastic or with a combination of glass or similar materials, so it can withstand higher temperatures delivered from the top of the "umbrella." A thin sheet of fiber optics material may be laid on the surface of the "umbrella" to shield the bundle from the elements and vandalism.

When applied to a land vehicle, for example a car lacking a combustion engine, the fiber optics umbrella sits safely on top of the car roof, where it is snugly secured forming part of the roof and/or ceiling. The car may further feature a retractable "sun roof" to protect the fiber optics umbrella from the elements or vandals when not in use. From the roof of the vehicle, the funnel fiber optics snakes though the car structural body cavities and into the top and bottom of the heat sink. The hot tip of the funnel fiber optics may contact a metal rod embedded in the center of the heat sink, thereby heating the carbon graphite heat sink, and thus heating the thermoelectric chips and producing electricity to power the vehicle causing it to accelerate, decelerate, stop, or move forwards or backwards.

Generally, the present thermoelectric vehicle invention would be equipped with two thermoelectric power generators and employ two motors that generate/store "extended heat," thereby supplying the thermoelectric generators with heat when sunlight is not available. Depending on the conversion efficiency of the installed thermoelectric chips, one thermoelectric generator may be sufficient to power the vehicle, while the other thermoelectric generator is held in reserve, cold, but ready to be activated when needed.

Conceivably, STEPV vehicles can be continuously driven 24 hours a day, in all weather conditions, for as long as the driver can safely continue driving. Although STEPV vehicles will have to follow all posted speed limits, it is believed that they could be operated at sustained speeds up to and above 200 miles per hour. As long as the heat sink remains hot, the thermoelectric chips will continue generating power to turn the DC motors mounted directly on the wheels of the vehicle, with power to spare for all auxiliary needs of the vehicle.

Since thermoelectric power generators are free-standing compact components including all peripheral parts that compose the vehicle power source, these components or parts can be housed in a sealed, climate-controlled lock box that can be taken in or out of the vehicle's front, center, or back compartments. In other words, one can mount or dismount the power generator lock box with ease, if desired. The vehicle may be sold with or without the power generator lock box and new vehicles may be brought to the market with or without the power generator lock box.

Having an air-tight, climate-controlled thermoelectric power generator lock box allows the vehicle to go amphibian or operate in harsh weather and terrain conditions, such as snow, ice, or desert conditions. "Specialty" models designed to operate in these conditions would be particularly well suited for government, military, police, homeland defense, fleet operators, the coast guard, or water sports applications. STEPV military vehicles that do not need traditional fuels to operate will be especially useful in active combat situations or to maximize civilian mass movement without worrying about fuel costs, safety, or delivery issues.

The manner of acquisition, ownership, registration, control, use, and maintenance of STEPV vehicles is envisioned to be similar to the present-day manner of buying and owning new or used combustion engine driven vehicles.

According to the present invention, a land vehicle with a power source derived from thermoelectric power generators heated by sunlight is provided. One embodiment is a land vehicle with a body shape similar to present day conventional vehicles, but lacking a combustion engine and all of the parts or components that go along with the operation of a combustion engine vehicle. This embodiment eliminates the need for the use of fossil fuels or alternative liquids or gasses to fuel the engine, instead the embodiment includes an umbrella-shaped bundle of fiber optics on the rooftop of the vehicle which tapers into a funnel shape on its opposite end and is directed toward a metal rod embedded in the center of a cylindrical-shaped carbon graphite heat sink. The heat sink becomes hot when heat from sunlight is captured by the umbrella-shaped fiber optic bundle and conducted through the fiber optics funnel to the cylindrical metal rod embedded within, and in contact with, the carbon heat sink.

The heated carbon heat sink may then transfer heat to the "hot side" of thermoelectric chips which are installed in series and securely wrapped around covering the cylindrical carbon heat sink. The heat activates the thermoelectric chips to generate electricity by the Seebeck effect. The electricity may then be directed into a converter, then to a power, electronics, and control system and optional auxiliary systems or apparatuses of the vehicle. When the vehicle is activated, for example by turning an ignition key in the vehicle and engaging a starting button, the vehicle is in a ready state able to function, accelerate, decelerate, and move forwards or backwards at the touch of a lever, gear, or switch within the driver's area, thereby activating direct current (DC) motors directly mounted to the wheels of the vehicle. The DC motors may be mounted to each wheel of the vehicle. Further, the vehicle may be directionally controlled by a steering wheel, and may be electrically and electronically managed by a motor controller/regenerative braking system thereby allowing the driver to operate the vehicle in a "normal" or conventional manner.

Another aspect of the invention allows the vehicle to operate in the absence of sunlight. In this case, the vehicle's power source may be heated by plugging it into a conventional household or office outlet for a few minutes. Once hot, the vehicle becomes ready to operate with no practical distance limitation for as long as the heat sink is constantly heated from its own operation aided by motors that generate/store "extended heat" that is useful when sunlight is not available to make the heat sink and thermoelectric chips hot. Also, an emergency method of starting the vehicle includes heating the heat sink by touching the heat sink's metal rod with an externally heated metallic unit until the heat sink attains the desired temperature for the thermoelectric chip to activate and generate electricity. This method may be thought of as "jump heating" the vehicle in comparison to the "jump starting" of a typical combustion engine.

Other than the thermoelectric power generator and heat sink unit, a STEPV vehicle has electrical, mechanical, electronics control and management systems, and operational characteristics similar to electric cars powered solely by batteries, and the only sound produced by a running STEPV is a low decibel muffled "hissing" sound from its wheels and the sound of wind as it impacts with the vehicle during movement. At a full stop, the STEPV manifests no sound and the only indication that the vehicle is running may be the colored operating lights on the dash board, steering wheel, backseat, and on all four sides of the external body of the vehicle.

In another embodiment of the present invention, a thermoelectric power generator may independently power a typical residential home or other structure, including the electrical needs of a typical house, office, or remote installations for decades. Such thermoelectric power generators when further enhanced, may be employed for almost all uses where electricity is required. The ability to independently generate a portable, safe, cost effective, durable, and environmentally friendly power source will have immeasurable positive advantages. Other exemplary embodiments and advantages of the present invention may be ascertained by reviewing the present disclosure and accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 is a cross-sectional view of strands of fiber optics arranges in an umbrella-like shape at one end and a funnel-like shape at the other end;

FIG. 6 is a cross-sectional and side view of a carbon graphite thermoelectric power generator heat sink utilized in one embodiment of the present invention, including a metal rod that acts as a heating element embedded in the center and through the length of the heat sink;

FIG. 10 is a front view of the driver and front passenger seats of one embodiment of the present invention;

FIG. 11 is a rear view of the driver and front passenger seats of FIG. 10;

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
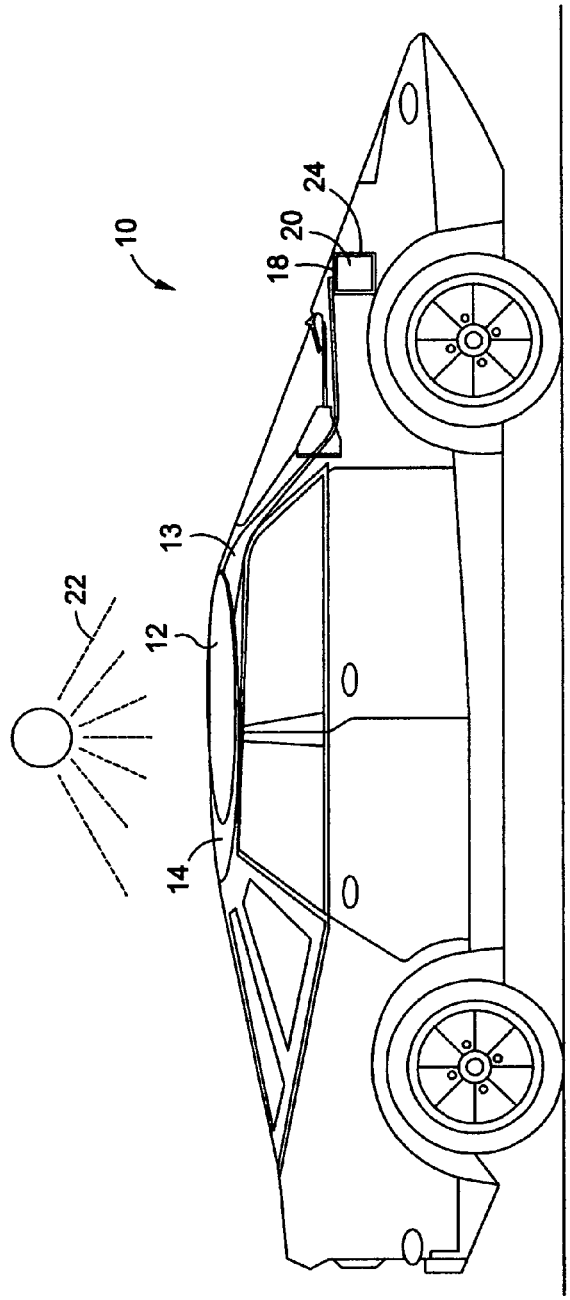
FIG. 1 is a side view of one embodiment of a solar thermoelectric powered vehicle of the present invention, in which the body of the vehicle is configured with an umbrella shaped fiber optics bundle in the roof.

One embodiment of the present invention encompasses an engineless Solar Thermoelectric Powered Vehicle 10 (STEPV). As can be seen in FIG. 1, the external body of the vehicle 10 may be configured like an ordinary, present day combustion engine powered car, with the notable exception of an umbrella shaped fiber optics bundle 12 mounted on the top of the roof 14. The fiber optics bundle 12 narrow into a funnel portion 16 which snakes inside the vehicle's 10 hollow structure and is directed toward a metal rod 18, or heating element, embedded in the center of and extending through the length of a carbon graphite heat sink 20. When sunlight 22 hits the umbrella shaped fiber optics bundle 12, heat is absorbed and conducted through the fiber optics funnel portion 16 to the metal rod 18 thus heating the heat sink 20 and the hot side of thermoelectric chips 24, which are wrapped around the heat sink 20, thereby producing electricity for the vehicle to operate.

Figure 3:
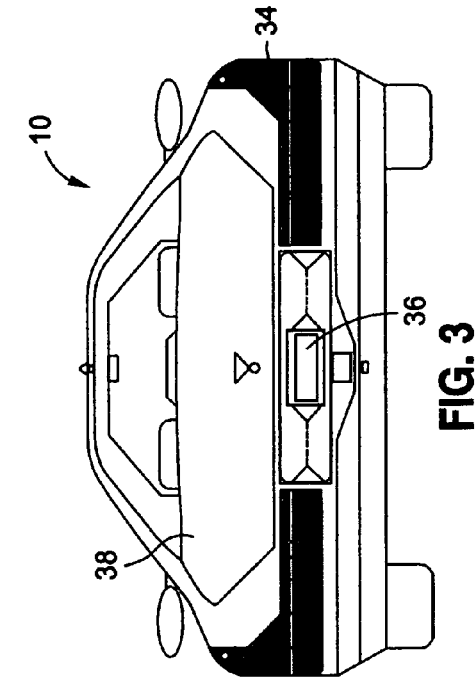
FIG. 3 is a rear view of the vehicle in FIG. 1 including the lack of an exhaust system.
Figure 2:
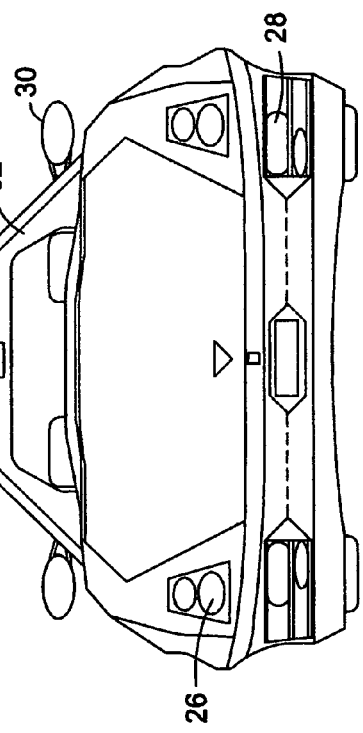
FIG. 2 is a front view of the vehicle in FIG. 1 including the lack of radiator grills.

FIG. 2 illustrates a front view of the vehicle 10, in which the vehicle 10 includes standard external features required of vehicle on the road today, for example, headlights 26, turn signals 28, side view mirrors 30, and a windshield 32. It is to be noted that the vehicle 10 does not require radiator grills as are typical in combustion engine vehicles. Similarly, FIG. 3 illustrates a rear view of the vehicle 10, in which the vehicle 10 features such standard vehicle features as tail lights 34, license plate holder 36, and trunk 38. Again, it is to be noted that the vehicle 10 lacks apparatuses required by combustion engine vehicles, such as exhaust tail pipes.

Figure 4:
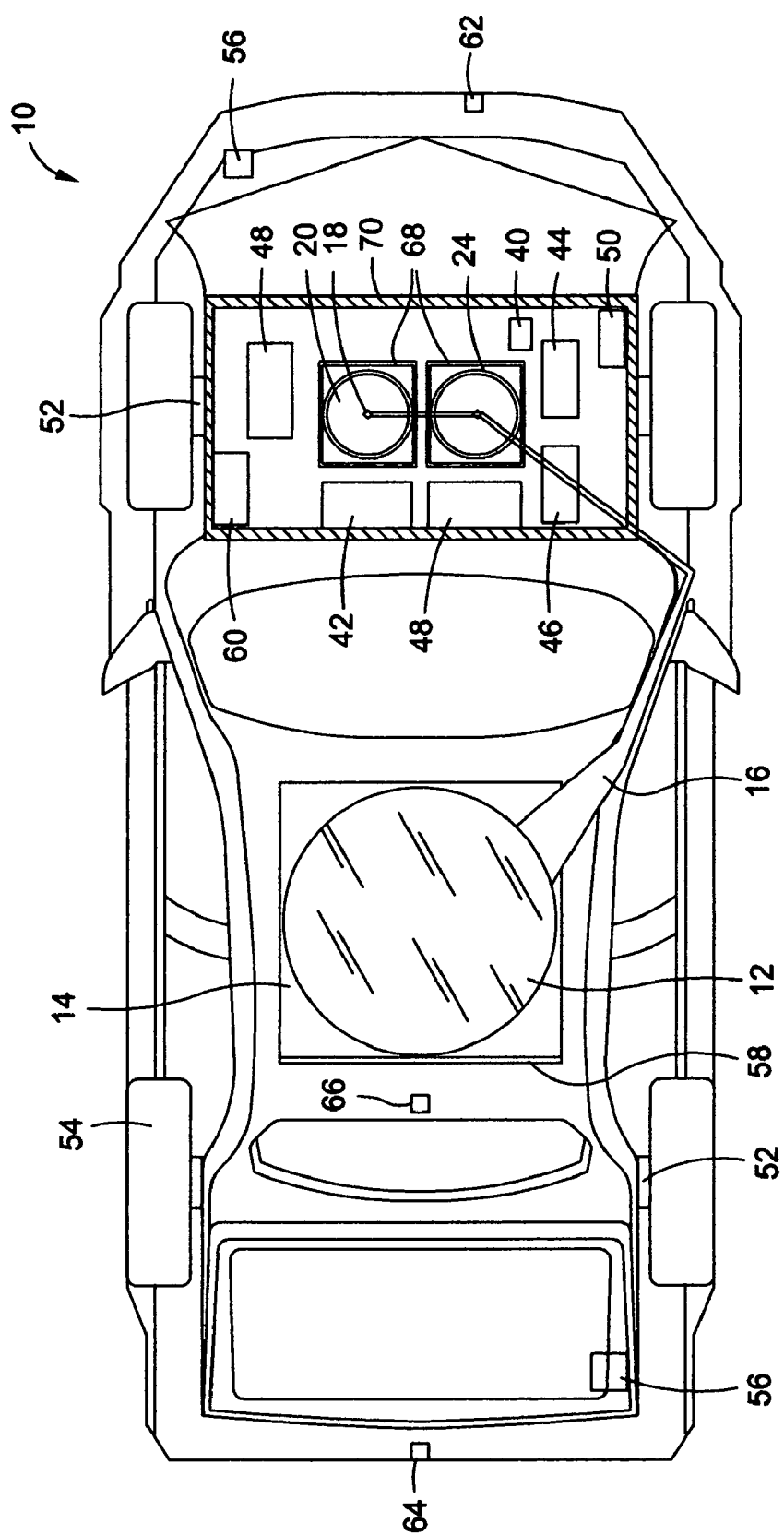
FIG. 4 is a top diagram view of the solar thermoelectric powered vehicle of FIG. 1 showing the body configuration, heat source conductors, power source, components, and auxiliary parts.

FIG. 4 is a cutaway top view of the vehicle 10 illustrating the working relationships between and among the different components of the vehicle 10. For example, the umbrella shaped fiber optics bundle 12 collect heat from sunlight 22, conducts such heat via the funnel portion of the fiber optics 16, and directs heat to vertical and horizontal metal rods 18 embedded in the center of a carbon graphite heat sink 20. The heat is evenly distributed to the entire body length of the cylindrical heat sink 20 thereby heating the hot side of the thermoelectric chips 24 wrapped around the full body of the heat sink 20, thus generating electricity. The generated electricity is first directed to a power converter 40 and then to an electronics management and control system 42 which distributes power to all operating components and accessories of the vehicle. Such components and accessories may include a regenerative braking system 44, a magnetic reed relay system 46, an extended heat generator 48, power storage 50, direct current (DC) motors 52 directly mounted to the wheels 54, front and/or rear retractable heating plugs 56, retractable roof motor 58, climate control 60, and all other power/electronics/switch needs of a thermoelectric powered vehicle 10. The extended heat generator 48 produces heat and augments heat to the heat sink 20, when necessary. Although the DC motors 52 may be mounted to any number of wheels 54, one embodiment includes DC motors 52 mounted to all wheels 54 of the vehicle 10. Further optional equipment may include a front warning sensor 62, rear warning sensor 64, and a rear view camera 66 mounted on the rear roof edge. To protect the thermoelectric power generator metal housing 68, an airtight, climate controlled lock box 70 may house the major internal components that comprise the thermoelectric system.

FIG. 5 illustrates an embodiment of an umbrella shaped fiber optics bundle 12 attached to a mounting support on the roof 14 that separates the umbrella portion 12 from the funnel portion 16 of the fiber optics. The funnel portion tip 72 may be constructed of pure fiber optics, glass, or other like materials that are capable of tolerating extreme temperatures.

FIG. 6 illustrates both a cross sectional view and a side view of the cylindrical carbon graphite heat sink 20 of one embodiment of the present invention. The heat sink 20 is shown with vertical and horizontal embedded metal rods 18 that are operative to receive heat from the fiber optics funnel portion tip 72 and uniformly distribute the heat throughout the entire length and body of the heat sink 20. Although described herein as being composed of carbon graphite, the heat sink 20 could be constructed from a variety of materials that are thermally but not electrically conductive, including, but not limited to, carbon materials, plastic materials, metal, stone, glass, ceramics, tiles, or composite materials. The embedded metal rods 18 serve as heating elements and help maintain and conserve heat.

Figure 7:
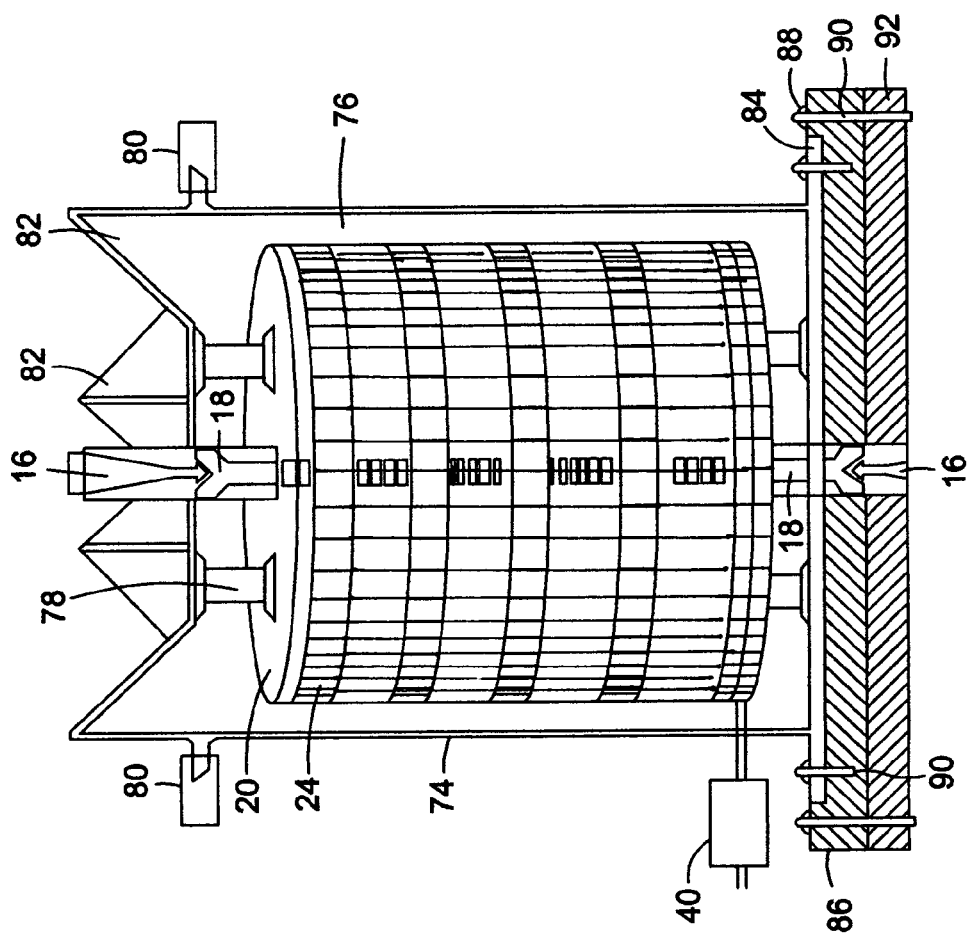
FIG. 7 is a side view of a thermoelectric power generator of the present invention.

FIG. 7 illustrates the design of one embodiment of the present invention featuring a thermoelectric power generator heated by sunlight. Heat from sunlight 22 is absorbed and conducted from the umbrella shaped fiber optics bundle 12, located on the vehicle's roof 14, through the funnel portion 16 to the metal rod 18 extending above, through, and below the heat sink 20. The metal rod 18 in turn conducts heat throughout the interior of the heat sink 20 to the surface or outer perimeter of the heat sink 20, which is covered by thermoelectric chips 24 installed with their hot sides positioned against the outer surface of the heat sink 20. The heat then begins heating the hot side of the thermoelectric chips 24, which upon reaching a particular temperature start generating electricity which is conducted through electrical wires to a power converter 40. The power converter 40 may convert the direct current (DC) to alternating current (AC) if necessary. The heat sink 20 is enclosed within a cylindrically shaped thermoelectric power generator body 74. The power generator body 74 is hollow and intentionally sized so as to allow for the presence of a hollow space 76 between the thermoelectric chips 24 and the inner wall of the body 74. Without presenting an exhaustive list of materials, the power generator body 74 may be constructed from metal materials, carbon materials, acrylic or plastic materials, cement, tiles, water-lined canisters, wood, glass, stone, clay, or composite materials.

Figure 8:
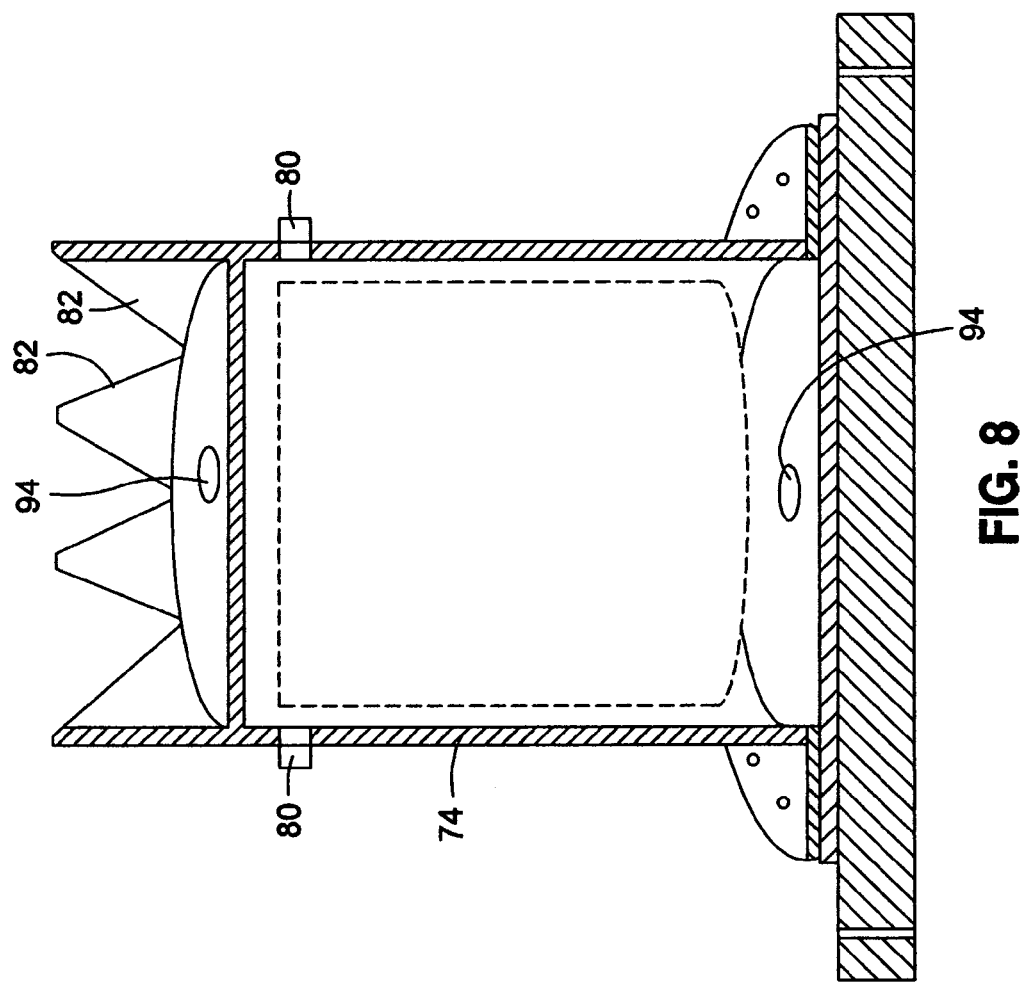
FIG. 8 is a cross-sectional view of a thermoelectric power generator housing.

The heat sink 20 is positioned and supported in place by at least four non-heat absorbing support assemblies 78. The support assemblies 78 are partly embedded into the top and bottom of the heat sink 20 and fasten the heat sink 20 unto the interior top and bottom walls of the thermoelectric power generator body 74. The temperature of the heat sink 20 while the vehicle is operational is much higher than the temperature inside the hollow space 76, which must be kept at ambient or near-ambient temperature. To regulate and maintain such temperature differential, the body 74 may include heat outlets 80 and/or cooling fins 82. The extra heat dissipated from the hollow space 76 through the heat outlets 80 may be directed to a heat storage unit (not shown) and later used to augment the heat sink heating requirement when necessary or to assist in starting the thermoelectric power generator. To ensure that the thermoelectric power generator is safely installed, it may include a mounting plate 84 and mounting base 86, which are secured by nuts 88 and bolts 90 to an anchor plate 92 to the floor of the lock box 70. The heat sink 20 may be positioned in almost any position, including vertically, horizontally, or at an incline. FIG. 8 is an illustration of the thermoelectric power generator body 74 including port holes 94 that are operative to receive the funnel portion 16 of the fiber optics.

Figure 9:
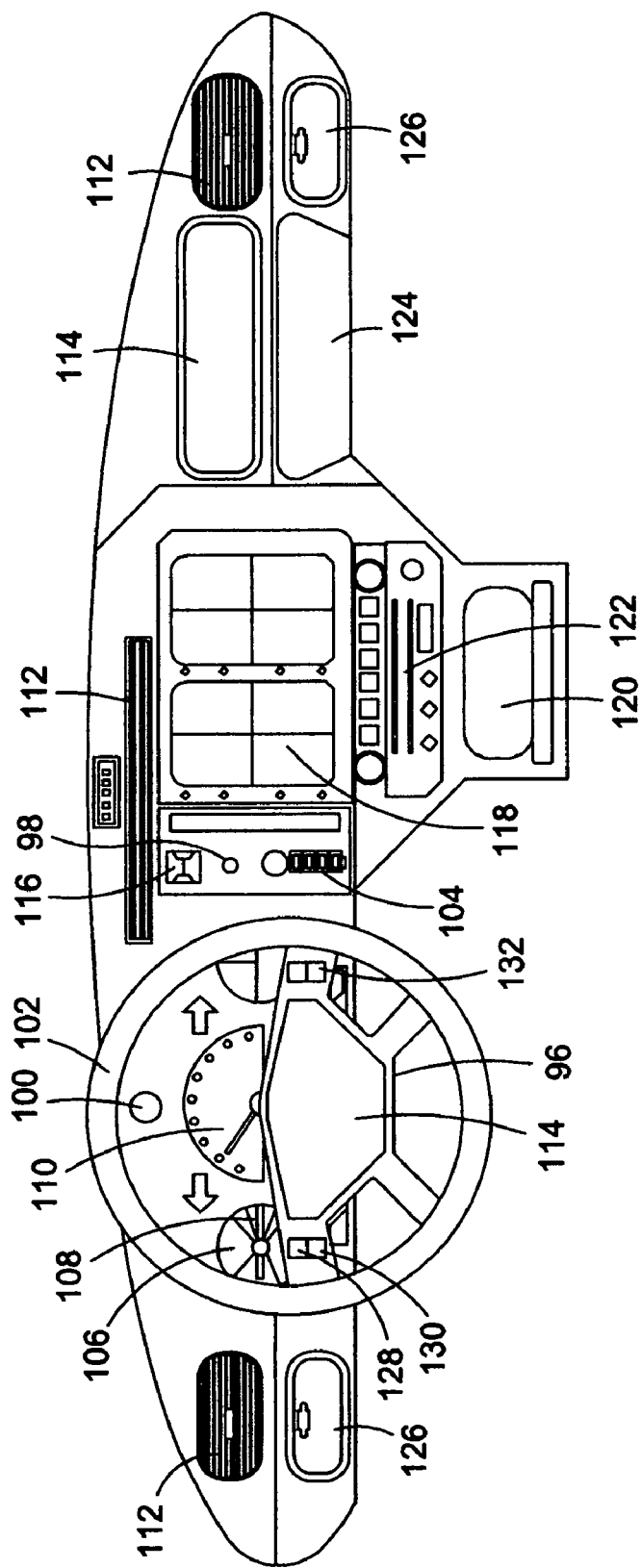
FIG. 9 is a front view of a dash board of one embodiment of the present invention.

FIG. 9 illustrates a dash board control panel of one embodiment of the present invention that is similar to that of present-day electric or combustion engine vehicle dash boards. The dashboard may include an ignition key port 96, starter button 98, on/off power light and meter indicator 100, steering wheel 102, gear box 104, thermoelectric temperature gauge 106, ampere meter 108, speedometer 110, air conditioning/heating vents 112, air bags 114, hazard lights button 116, GPS map/rear camera monitor/TV/DVD monitor 118, storage compartment 120, radio/cassette/CD unit 122, glove compartment 124, coin compartment 126, cruise control on switch 128, cruise control off switch 130, and radio remote controls 132.

FIG. 10 illustrates a front view of a driver seat 136 and front passenger seat 138 of one embodiment of the present invention. The seats may include a lumbar support massage apparatus 140, a headrest 142 with built in speakers, arm rests 144 with built in cup holders, a center console 146, a stick control 148 for amphibious models, and a center console cover 150. Because of the ability of the vehicle to run with no practical distance limitation, certain models may be equipped with a discreet and retractable urine disposal unit 152, which may be particularly useful for operators employed in long distance sales, delivery, first aid, drivers, etc. The disposal unit 152 is attached to a safety glass spout tube (not shown) which is connected to a detachable sanitary container (not shown) located in the back trunk 38 of the vehicle 10. The sealed unit is equipped with self-sanitizing odor/water provision that can easily be pulled out of the vehicle 10, the contents discharged appropriately, washed, and remounted in the vehicle 10.

FIG. 11 illustrates a rear view of the driver seat 136 and front passenger seat 138, including additional optional features, such as a mini camera 154, screen 156, back seat pocket 158, folding table 160, and table latch 162.

Figure 12:
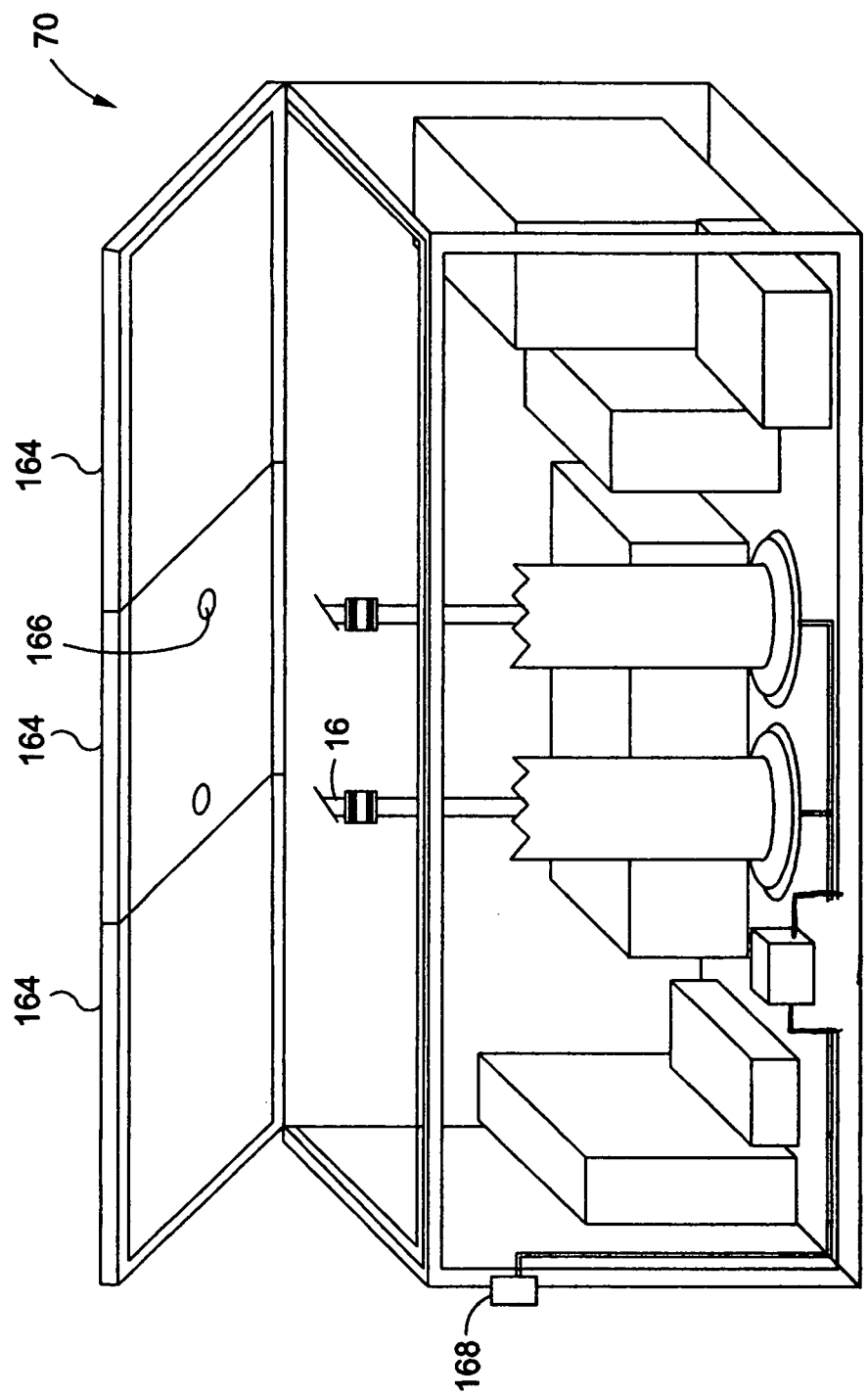
FIG. 12 is a schematic view of a water-proof, climate controlled, portable metal lock box that houses the internal thermoelectric power generators, accessories, and components of one embodiment of the present invention, while FIG. 12-A illustrates the external appearance of the closed lock box of FIG. 12.

FIG. 12 illustrates one embodiment of the thermoelectric power generator lock box 70 of the present invention. The lock box 70 may include multiple independently opening lids 164, fiber optics ports 166 for receiving the funnel portion 16 of the fiber optics, a power switch/plug unit 168, and the thermoelectric power generator internal components. The components may be positioned within the lock box 70 in various manners that would best suit the safe, secured, and practical positioning of each component. The lock box 70 may be lined with safety materials, such as lead. The lock box 70 may further include carrying handles (not shown) for removal of the lock box 70 from the vehicle 10.

Figure 13:
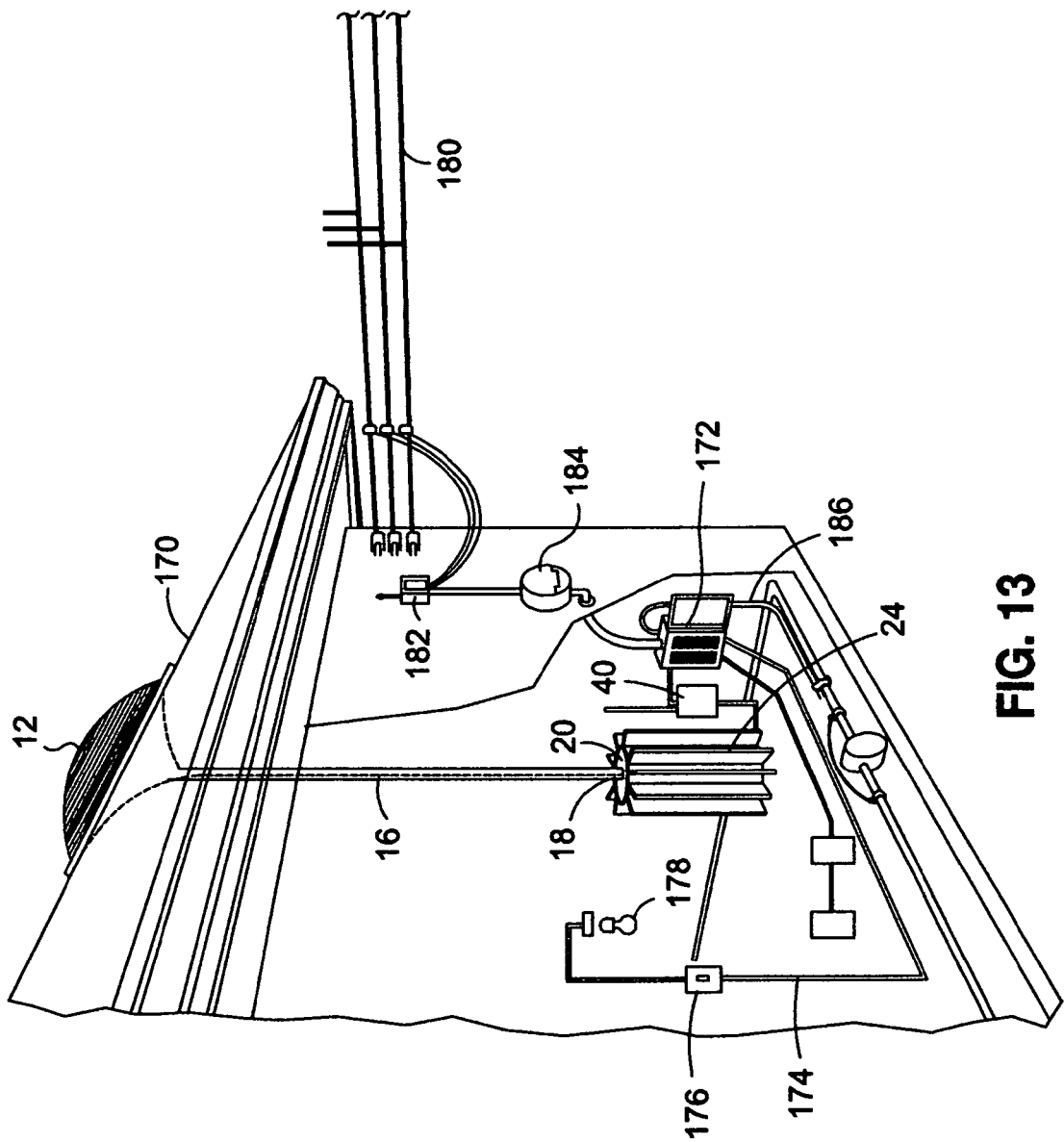
FIG. 13 is a schematic representation of a thermoelectric power generator heated by sunlight powering a structure as envisioned by one embodiment of the present invention.

FIG. 13 illustrates another embodiment of the present invention wherein a thermoelectric power generator may be employed to power a structure. An umbrella shaped fiber optics bundle 12 is securely installed in a location capable of receiving sunlight 22, for example, atop the sunny side of the roof 170 of a house, building, or other structure. The heat absorbed by the fiber optics bundle 12 is then conducted through the funnel portion 16 to the metal rod 18 embedded within the heat sink 20 thereby causing the thermoelectric chips 24 to become hot and generate electricity. The electricity is then directed to a power converter 40 and then to a main switch box 172. The electrical current is then directed to the electrical circuits of the structure, exemplified in this figure by a light circuit 174 connected to a light switch 176 which turns on or off a light bulb 178. Prior to engaging the thermoelectric power generator, power originating from the main electrical line 180 should be turned off from the service head panel 182 so that power does not come in through the electric meter 184. Alternatively, electricity from the thermoelectric power generator may be routed to the main electrical line 180 thereby causing the electric meter 184 to run in reverse. As is typical, proper grounding 186 must be included within the circuit. It is envisioned that the vehicle thermoelectric power generator previously discussed may be utilized to power the structure, or a separate standalone thermoelectric power generator may be utilized.

The above description is given by way of example, and not limitation. Given the above disclosure, one skilled in the art could devise variations that are within the scope and spirit of the invention disclosed herein, including various ways of heating, powering, activating, or starting the vehicle, such as by sunlight, isotope elements, metallic rod heated from an external source temporarily touching the metal rod in the heat sink, or batteries. Additionally, different body designs, including amphibious designs, may be utilized so long as the heat source of choice can safely and efficiently be deployed within the body. Also, thermoelectric power generators are not necessarily restricted for use in land, air, or sea conveyance, and may be utilized to power equipment, apparatuses, structures, and any and all things requiring electrical power. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A solar thermoelectric powered vehicle lacking a combustion engine, said vehicle comprising:
   a. a fiber optics bundle operative to absorb heat from sunlight;
   b. a heating element in thermal contact with the fiber optics bundle, wherein the heating element is embedded within and extends through the length of a heat sink;
   c. a plurality of thermoelectric chips, wherein a hot side of each thermoelectric chip is in contact with an outer surface of the heat sink and wherein the thermoelectric chips are operative to produce electricity upon being heated;
   d. a hollow body surrounding the heat sink;
   e. a hollow space between the thermoelectric chips and the hollow body;
   f. a power converter in electrical contact with the thermoelectric chips; and
   g. at least one DC motor mounted to a wheel of the vehicle, wherein the DC motor is operative to receive electricity from the power converter and to rotate the wheel upon receiving said electricity.

2. The solar thermoelectric powered vehicle of claim 1, further comprising:
   h. a system for managing and controlling the output of electricity from the power converter.

3. The solar thermoelectric powered vehicle of claim 1, wherein the fiber optics bundle is umbrella shaped at a first end, narrows throughout a funnel portion, and terminates in a tip at a second end.

4. The solar thermoelectric powered vehicle of claim 3, wherein the first end of the fiber optics bundle is mounted on an exterior of the vehicle.

5. The solar thermoelectric powered vehicle of claim 4, wherein the first end of the fiber optics bundle is mounted on a roof of the vehicle.

6. The solar thermoelectric powered vehicle of claim 1, wherein the heating element is a metal rod.

7. The solar thermoelectric powered vehicle of claim 6, wherein the metal rod spans the vertical length of the heat sink and extends beyond the body of the heat sink at both ends.

8. The solar thermoelectric powered vehicle of claim 7, wherein the metal rod further contains horizontal branching portions embedded within the heat sink.

9. The solar thermoelectric powered vehicle of claim 1, wherein the heat sink is composed from a material selected from the group consisting of carbon, plastic, metal, stone, glass, ceramics, tiles, or composite materials.

10. The solar thermoelectric powered vehicle of claim 9, wherein the heat is composed of carbon graphite.

11. The solar thermoelectric powered vehicle of claim 1, wherein the thermoelectric chips are connected in series.

12. The solar thermoelectric powered vehicle of claim 1, wherein the hollow body is composed from a material selected from the group consisting of metal, carbon, acrylic, plastic, cement, wood, glass, stone, clay, or composite materials.

13. The solar thermoelectric powered vehicle of claim 1, wherein the hollow body further includes cooling fins.

14. The solar thermoelectric powered vehicle of claim 1, wherein the hollow body further includes heat outlets.

15. The solar thermoelectric powered vehicle of claim 14, further comprising a heat storage unit in thermal contact with the heat outlets.

16. The solar thermoelectric powered vehicle of claim 1, wherein the power converter is operative to convert the direct current produced from the thermoelectric chips to alternating current.

17. The solar thermoelectric powered vehicle of claim 1, wherein a DC motor is mounted to each wheel of the vehicle.

18. The solar thermoelectric powered vehicle of claim 1, wherein the heating element, heat sink, thermoelectric chips, hollow body, and power converter are contained within a lockbox mounted within the vehicle.

19. The solar thermoelectric powered vehicle of claim 18, wherein the lockbox is removable from the vehicle.

20. The solar thermoelectric powered vehicle of claim 19, wherein the lockbox may be attached to a structure thereby providing electricity to the structure.

* * * * *